UNITED STATES PATENT OFFICE.

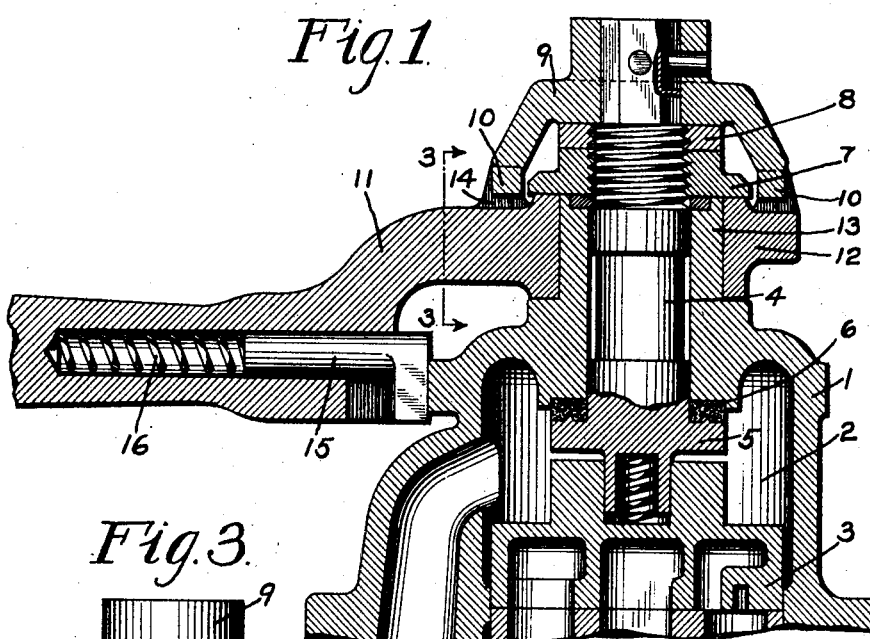
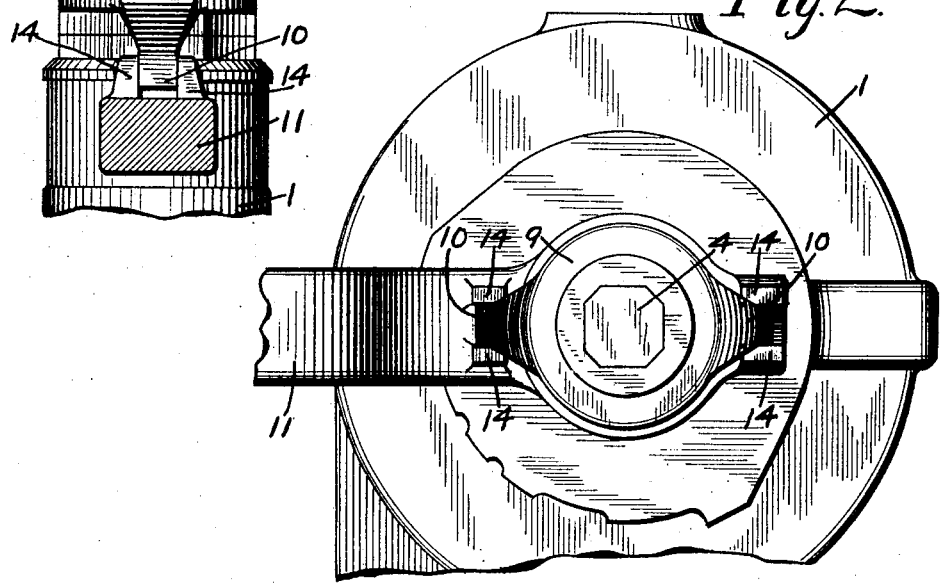

ALAN W. RENDELL, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,403,870.     Specification of Letters Patent.     Patented Jan. 17, 1922.

Application filed November 30, 1918. Serial No. 264,870.

*To all whom it may concern:*

Be it known that I, ALAN W. RENDELL, a subject of the King of Great Britain, and a resident of 10 Kensington Palace Mansions, De Vere Gardens, London, England, have invented a certain new and useful Improvement in Brake-Valve Devices, of which the following is a specification.

This invention relates to valve operating devices, and more particularly to the type employed in connection with engineers' brake valves, in which a rotatable spindle or shaft is connected to the valve and is adapted to be operated by a handle or lever.

It has heretofore been customary to actuate the valve spindle by means of a handle mounted directly, and usually removably, on the projecting end of the spindle, and in order to define the various operating positions of the valve and handle, it is usual to provide a spring pressed stop in the handle, which is adapted to engage corresponding recesses formed in the adjacent section of the valve casing.

The power stored in the spring operates through the handle to produce a side pressure on the spindle, which after a time causes the spindle to wear unevenly in its bearing and also causes uneven wear on the leather seating usually employed to prevent leakage, and this wear is accentuated by the one-sided pressure of the operator's hand in manipulating the handle.

By reason of the uneven wear above referred to, leakage of fluid under pressure around the spindle is very liable to occur.

The principal object of my invention is to provide means for overcoming the above defects.

In the accompanying drawing; Fig. 1 is a vertical section of an engineer's brake valve embodying my invention; Fig. 2 a plan view thereof; and Fig. 3 a partial section on the line 3—3 of Fig. 1.

The brake valve device shown in the drawing comprises a casing 1 having a valve chamber 2, containing the usual rotary valve 3 adapted to be operated by a rotatable spindle or shaft 4.

The lower end of the spindle 4 is provided with a flange 5 adapted to engage and make an air-tight joint with a leather seat 6, while the upper end of the spindle is provided with an adjusting nut 7 and a lock-nut 8.

The upper end of the spindle is made polygonal, and according to my invention, has mounted thereon a cap 9 having downwardly projecting and diametrically opposite lugs 10, 10.

The brake valve handle 11 is provided with a hub portion 12 having a circular bore adapted to easily fit over a corresponding neck portion 13 provided at the upper end of the casing 1 and terminating in a shoulder upon which the hub portion of the handle rests, the hub portion being secured in position, by the nut 7.

On the upper face of the hub portion 12 are provided diametrically opposite lugs 14 forming recesses within which the lugs 10 engage.

Within the handle is mounted the usual stop 15, acted upon by spring 16, and adapted to engage notches formed on the periphery of the casing 1.

It will now be seen that with the above described construction, side pressure due to the spring 16 and also pressure due to the lifting action of the operator's hand on the handle is not transmitted to the valve spindle 4, since there is lost motion present, in a vertical plane, between the handle 11 and the lugs 10. In the plane of rotation, however, there is positive engagement between the handle and the lugs 10, so that the spindle 4 may be rotated by the handle in either direction.

Having now described my invention, what I claim as new and desire to secure by Letters Patent, is:—

1. The combination with a valve, a fixed casing containing said valve and having a cylindrical bearing, and a rotatable spindle for operating said valve, of a handle rotatably mounted on said bearing, a member secured to said spindle and in operative engagement with the handle to transmit force only in the plane of rotation.

2. The combination with a valve, a fixed casing containing said valve and having a cylindrical bearing, and a rotatable spindle for operating said valve, of a handle rotatably mounted on said bearing, a member secured to said spindle, and an operative connection between the handle and said member for transmitting force in the plane of rotation and adapted to permit relative movement between the parts in a plane transverse to the plane of rotation.

3. The combination with a valve, a fixed casing containing said valve, and a rotatable spindle for operating said valve, of a handle rotatably mounted on said casing and having recesses, and a cap secured to said spindle and provided with lugs for engaging within said recesses.

In testimony whereof I have hereunto set my hand.

ALAN W. RENDELL.